(12) United States Patent
Kawasaki et al.

(10) Patent No.: US 9,965,691 B2
(45) Date of Patent: May 8, 2018

(54) APPARATUS FOR RECOGNIZING LANE PARTITION LINES

(71) Applicant: DENSO CORPORATION, Kariya, Aichi-pref. (JP)

(72) Inventors: Naoki Kawasaki, Nishio (JP); Koujirou Tateishi, Nishio (JP); Shunsuke Suzuki, Kariya (JP); Hiroshi Mizuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 36 days.

(21) Appl. No.: 15/282,133

(22) Filed: Sep. 30, 2016

(65) Prior Publication Data
US 2017/0091564 A1    Mar. 30, 2017

(30) Foreign Application Priority Data
Sep. 30, 2015    (JP) .................................. 2015-193762

(51) Int. Cl.
*G06K 9/00* (2006.01)
*G01C 21/30* (2006.01)
*B60W 30/12* (2006.01)

(52) U.S. Cl.
CPC ......... *G06K 9/00798* (2013.01); *B60W 30/12* (2013.01); *G01C 21/30* (2013.01)

(58) Field of Classification Search
CPC .... G06K 9/00798; G01C 21/30; B60W 30/12
See application file for complete search history.

(56) References Cited

U.S. PATENT DOCUMENTS

| | | | |
|---|---|---|---|
| 8,116,523 B2* | 2/2012 | Amagasaki | G06K 9/00805 340/425.5 |
| 8,705,796 B2* | 4/2014 | Ogata | B60R 21/0134 382/103 |
| 9,141,870 B2* | 9/2015 | Fukata | G06K 9/00791 |
| 2009/0138193 A1* | 5/2009 | Katou | G01C 21/3658 701/533 |
| 2013/0103304 A1* | 4/2013 | Nishibashi | G01C 21/3655 701/410 |

(Continued)

FOREIGN PATENT DOCUMENTS

| | | |
|---|---|---|
| JP | H09-35198 A | 2/1997 |
| JP | 2013-190841 A | 9/2013 |

*Primary Examiner* — Gregory M Desire
(74) *Attorney, Agent, or Firm* — Knobbe, Martens, Olson & Bear, LLP

(57) ABSTRACT

In an apparatus for recognizing a lane partition line, a pre-branch section setting unit sets a pre-branch section of a road on which an own vehicle is traveling. The pre-branch section extends a section length from a start line that is positioned closer to the own vehicle than a branch location by an offset distance in a traveling direction of the own vehicle. A determination unit determines whether or not a geographical location of the own vehicle is within the pre-branch section. If it is determined that the geographical location of the own vehicle is within the pre-branch section, a recognition unit suppresses recognition of the lane partition line on an diverging road side of the road on which the own vehicle is traveling. The diverging road is another road branching off from the road on which the vehicle is traveling at the branch location.

6 Claims, 10 Drawing Sheets

(56) References Cited

U.S. PATENT DOCUMENTS

| | | | |
|---|---|---|---|
| 2015/0149036 A1* | 5/2015 | You | B60W 30/12 |
| | | | 701/41 |
| 2015/0348275 A1* | 12/2015 | Kumano | G06T 7/12 |
| | | | 382/199 |
| 2016/0012299 A1* | 1/2016 | Maeda | G06K 9/00798 |
| | | | 382/104 |
| 2017/0091564 A1* | 3/2017 | Kawasaki | G06K 9/00798 |

* cited by examiner

APPARATUS FOR RECOGNIZING LANE PARTITION LINES

CROSS-REFERENCE TO RELATED APPLICATION

This application is based on and claims the benefit of priority from earlier Japanese Patent Application No. 2015-193762 filed Sep. 30, 2015, the description of which is incorporated herein by reference.

BACKGROUND

Technical Field

The present invention relates to an apparatus for recognizing lane partition lines.

Related Art

Conventionally, techniques are known for providing driving assistance, such as a lane keep assist (LKA) or pre-crash safety system (PCS), based on recognized lane partition lines, such as white lines, in an image captured by a vehicle-mounted camera (see, for example, JP-A-H09-35198).

In the presence of a branch of a road on which an own vehicle is traveling, positioned forward of the own vehicle, such conventional techniques may mistakenly recognize a lane partition line of an diverging lane as a lane partition line of a lane continuing in a traveling direction of the own vehicle.

In consideration of the foregoing, exemplary embodiments of the present invention are directed to providing techniques for preventing such misrecognition that may be caused by the presence of a branch.

SUMMARY

In accordance with an exemplary embodiment of the present invention, there is provided an apparatus for recognizing a lane partition line. In the apparatus, an image acquisition unit acquires an image of a front view of a vehicle carrying the apparatus, a recognition unit recognizes the lane partition line based on the image acquired by the image acquisition unit, a map information acquisition unit acquires map information including a branch location on a road on which the vehicle is traveling from a map information storage storing the map information. Further, a location information acquisition unit acquires location information of the vehicle, a geographical location acquisition unit acquires a geographical location of the vehicle based on the map information and the location information of the vehicle acquired by the location information acquisition unit, and a pre-branch section setting unit sets a pre-branch section of the road on which the vehicle is traveling. The pre-branch section is a section extending a section length from a start line that is positioned closer to the vehicle than the branch location by an offset distance in a traveling direction of the vehicle. A determination unit, based on the geographical location of the vehicle acquired by the geographical location acquisition unit and the pre-branch section of the road set by the pre-branch section setting unit, determines whether or not the geographical location of the vehicle is within the pre-branch section of the road on which the vehicle is traveling.

In the apparatus, if it is determined by the determination unit that the geographical location of the vehicle acquired by the geographical location acquisition unit is within the pre-branch section of the road on which the vehicle is traveling set by the pre-branch section setting unit, the recognition unit suppresses recognition of the lane partition line on an diverging road side of the road on which the vehicle is traveling. The diverging road branches off from the road on which the vehicle is traveling at the branch location.

With this configuration, within the pre-branch section extending the section length from the start line that is positioned closer to the vehicle than the branch location by the offset distance in the traveling direction of the vehicle, recognition of the lane partition line of the road on the diverging road side is suppressed. This can prevent the lane partition line of the road on which the vehicle is traveling on the diverging road side from being mistakenly recognized as the lane partition line of the road on which the vehicle is traveling.

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

1. Configuration of Lane Partition Line Recognition Apparatus

Figure 1:
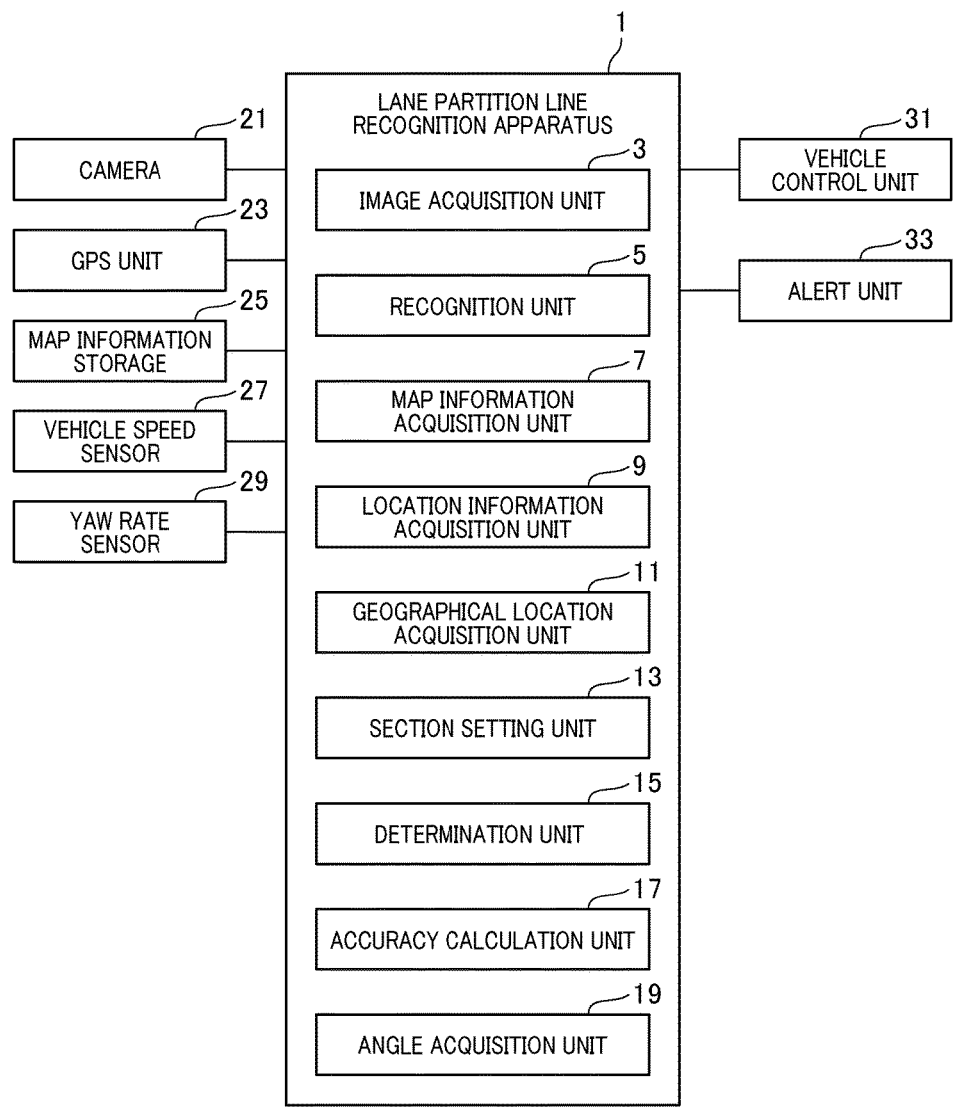
FIG. 1 is a block diagram of a lane partition line recognition apparatus in accordance with one embodiment of the present invention.

An exemplary configuration of a lane partition line recognition apparatus 1 in accordance with one embodiment of the present invention will now be described with reference to FIG. 1. The lane partition line recognition apparatus 1 is mounted in a vehicle. The vehicle carrying the lane partition line recognition apparatus 1 may hereinafter be referred to as an own vehicle. The lane partition line recognition apparatus 1 may be configured as a well-known computer including a central processing unit (CPU), a read-only memory (ROM), a random-access memory (RAM), and other components. Various processes described later may be implemented by the CPU executing computer programs stored in the ROM or the like.

The lane partition line recognition apparatus 1 includes an image acquisition unit 3, a recognition unit 5, a map information acquisition unit 7, a location information acquisition unit 9, a geographical location acquisition unit 11, a section setting unit 13, a determination unit 15, an accuracy calculation unit 17, and an angle acquisition unit 19. Functions of these units as functional blocks will be described later.

The own vehicle further includes a camera 21, a global positioning system (GPS) unit 23, a map information storage 25, a vehicle speed sensor 27, a yaw rate sensor 29, a vehicle control unit 31, and an alert unit 33. The camera 21 captures images of a front view of the own vehicle. The camera 21 has an angle of view including a road surface in front the own vehicle.

The GPS unit 23 acquires location information of the own vehicle. The location information is represented by absolute coordinates on the Earth. The GPS unit 23 is an example of the satellite positioning system. The map information storage 25 has stored the map information. The map information includes information about locations of branches of each road. The vehicle-speed sensor 27 detects a vehicle speed of the own vehicle. The yaw rate sensor 29 detects a yaw rate of the own vehicle.

The vehicle control unit 31 performs driving assistance processing using lane partition lines recognized by the lane partition line recognition apparatus 1. The driving assistance processing includes well-known lane keeping assist (LKA), pre-crash safety system (PCS), or other driving assistance technologies.

The alert unit 33 is configured to, if the own vehicle deviates from a lane partition line recognized by the lane partition line recognition apparatus 1, alert a driver of the own vehicle via a voice, an image or the like.

Figure 2:
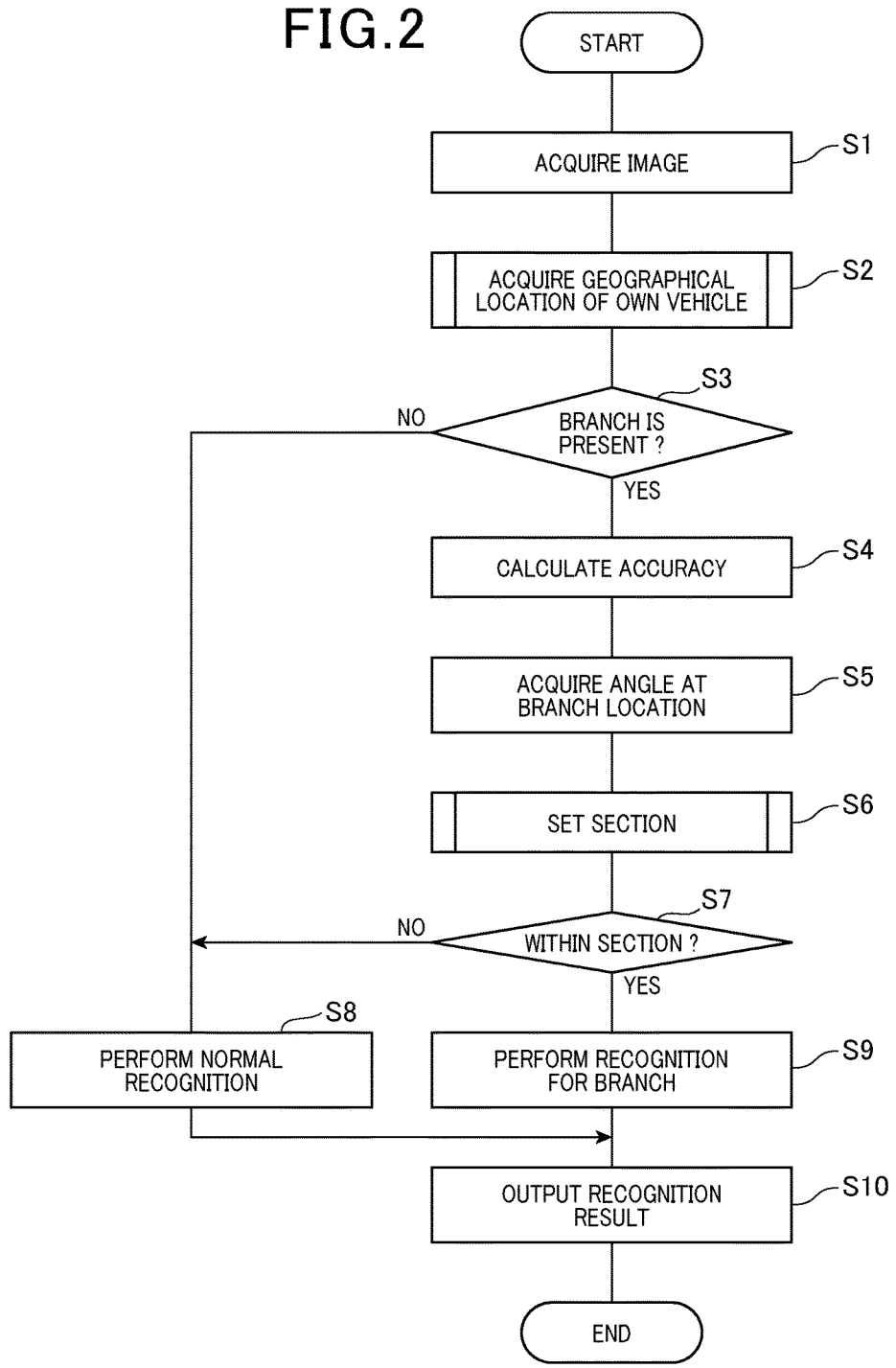
FIG. 2 is a flowchart of overall processing to be performed in the lane partition line recognition apparatus.
Figure 3:
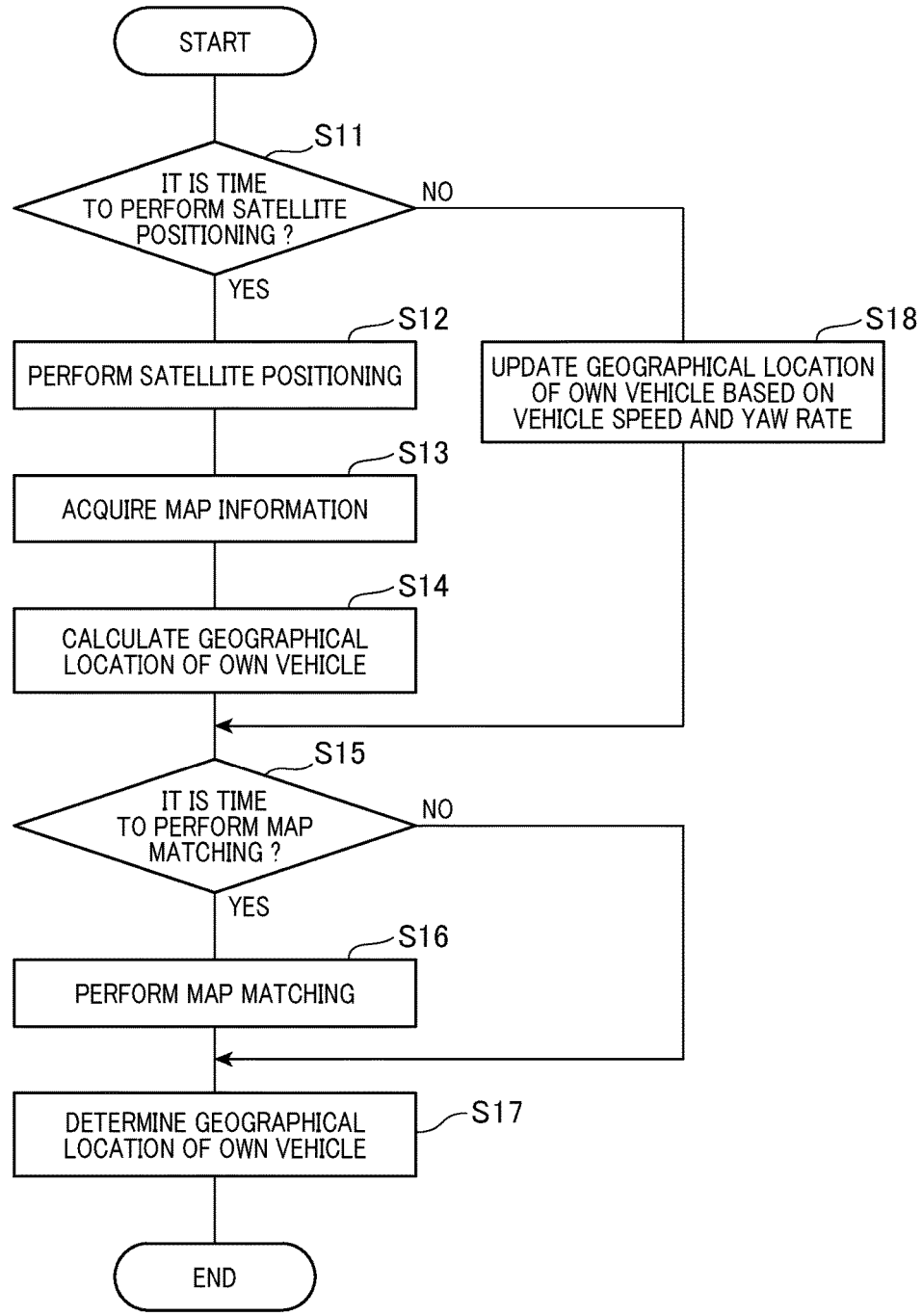
FIG. 3 is a flowchart of vehicle location acquisition processing to be performed in the lane partition line recognition apparatus.

2. Overall Processing to be Performed in Lane Partition Line Recognition Apparatus Overall processing to be performed in the lane partition line recognition apparatus 1 will now be described with reference to FIGS. 2-8. Referring to FIG. 2, in step S1, the image acquisition unit 3 acquires an image using the camera 21.

In step S2, the location information acquisition unit 9 acquires a geographical location (i.e., a location on a map) of the own vehicle. Specifically, referring to FIG. 3, in step S11, the location information acquisition unit 9 determines whether or not it is time to perform satellite positioning processing. The satellite positioning processing is performed every predetermined time interval. If the location information acquisition unit 9 determines that it is time to perform the satellite positioning processing, then the process flow proceeds to step S12. Otherwise, the process flow proceeds to step S18.

In step S12, the location information acquisition unit 9 performs satellite positioning using the GPS unit 23 to acquire the location information of the own vehicle.

In step S13, the map information acquisition unit 7 acquires the map information from the map information storage 25.

In step S14, the geographical location acquisition unit 11 matches the location information of the own vehicle acquired in step S12 with the map information acquired in step S13 to calculate the geographical location of the own vehicle.

If in step S11 it is determined that it is not time to perform the satellite positioning, then the process flow proceeds to step S18. In step S18, the geographical location acquisition unit 11 updates the geographical location of the own vehicle calculated in the previous cycle to a predicted location acquired in the current cycle using sensed values of the vehicle-speed sensor 27 and the yaw rate sensor 29.

In step S15, the geographical location acquisition unit 11 determines whether or not it is time to perform map matching. The map matching is performed every predetermined time interval. If the location information acquisition unit 9 determines that it is time to perform the map matching, then the process flow proceeds to step S16. Otherwise, the process flow proceeds to step S17.

In step S16, the geographical location acquisition unit 11 performs the map matching. In the map matching, the geographical location of the own vehicle is corrected such that a history of the geographical location of the own vehicle calculated in step S14 or S18, i.e., a travel trajectory of the own vehicle, lies on a road.

In step S17 performed in the geographical location acquisition unit 11, the geographical location of the own vehicle is determined. Specifically, if the map matching has been performed in step S16, the geographical location of the own vehicle is given by the corrected location of the own vehicle after the map matching. If the map matching has not been performed in step S16, the geographical location of the own vehicle is given by the location of the own vehicle calculated in step S14 or S18.

Returning back to FIG. 2, in step S3, the map information acquisition unit 7 acquires the map information from the map information storage 25. Subsequently, the section setting unit 13 determines the presence or absence of a branch location that satisfies both the following conditions 31 and 32.

J1: The branch location is forward of the geographical location of the own vehicle acquired in step S2.

J2: A distance from the own vehicle to the branch location is within a predetermined range.

Figure 6A:
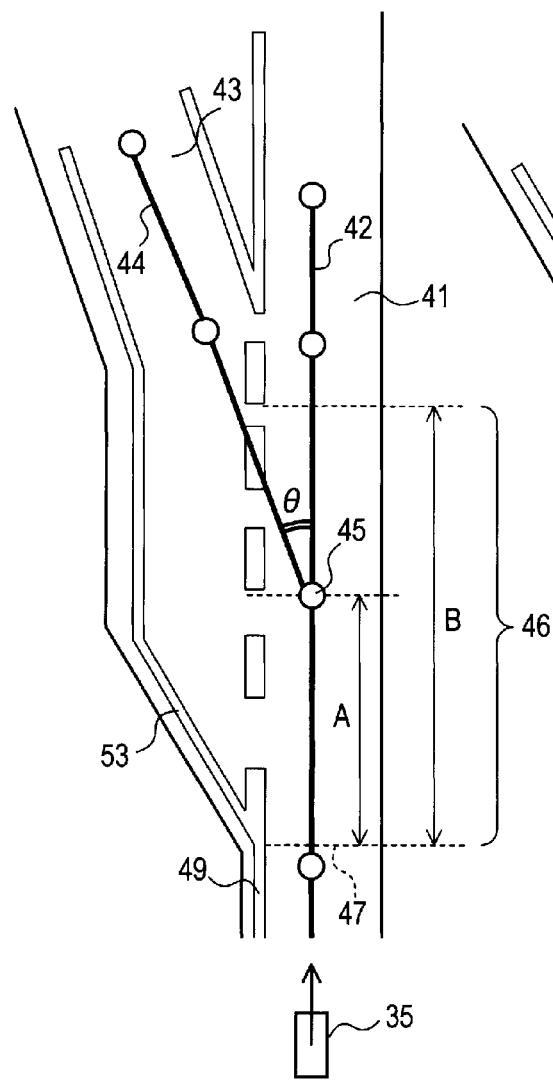
FIG. 6A is an illustrative example of a pre-branch section for a small angle θ.
Figure 6B:
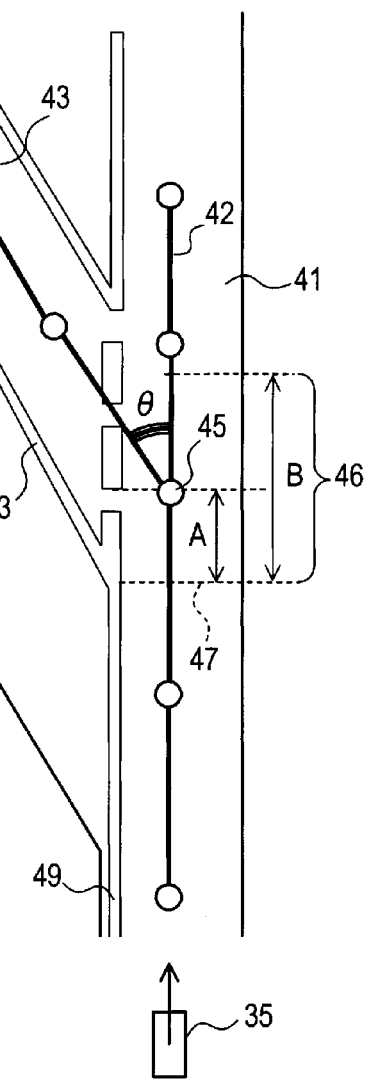
FIG. 6B is an illustrative example of a pre-branch section for a large angle θ.
Figure 7:
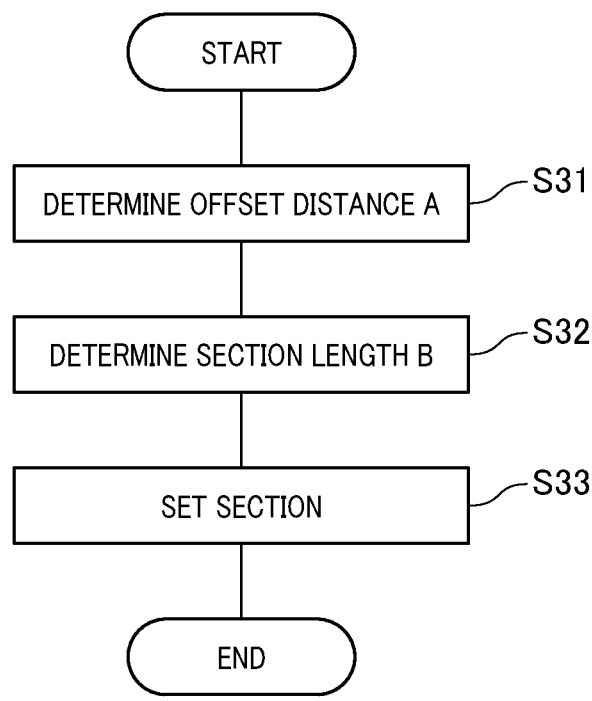
FIG. 7 is a flowchart of pre-branch section setting processing to be performed in the lane partition line recognition apparatus.

The branch location is location information included in the map information, indicative of a location of a branch, e.g., a branch location 45 in FIGS. 6A and 6B.

In the presence of a branch location that satisfies the conditions J1 and J2, then the process flow proceeds to step S4. In the absence of a branch location that satisfies the conditions J1 and J2, then the process flow proceeds to step S8. In step S4, the accuracy calculation unit 17 determines the accuracy of the geographical location of the own vehicle determined in step S2 in a front-to-rear direction of the own vehicle (hereinafter referred to as longitudinal accuracy). The longitudinal accuracy is a metric indicative of how accurate the location of the own vehicle acquired in step S2 is in the front-to-rear direction of the own vehicle. Front-to-rear accuracy calculation processing will now be explained with reference to FIG. 4.

Figure 4:
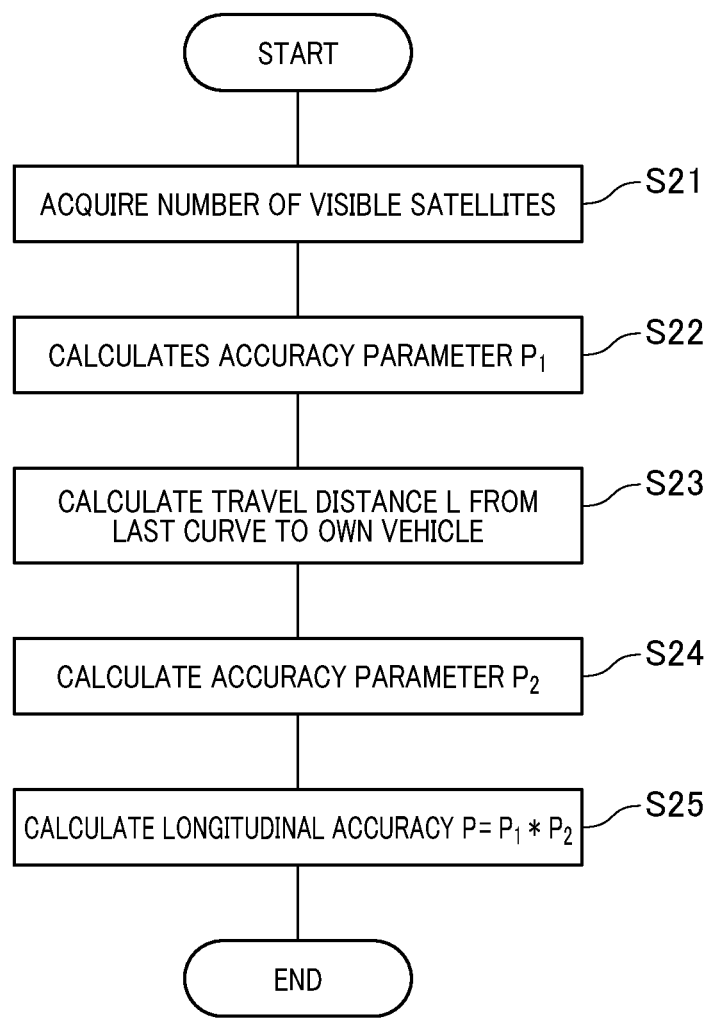
FIG. 4 is a flowchart of accuracy calculation processing to be performed in the lane partition line recognition apparatus.

Referring to FIG. 4, in step S21, the accuracy calculation unit 17 acquires the number of visible satellites used in the last GPS positioning performed in step S12.

In step S22, the accuracy calculation unit 17 calculates an accuracy parameter P1 as a function of the number of visible satellites acquired in step S21. The accuracy calculation unit 17 includes a first map that outputs the accuracy parameter P1 in response to the number of visible satellites. The accuracy calculation unit 17 uses the first map to acquire the accuracy parameter P1. In this map, the accuracy parameter P1 is decreased with decreasing number of visible satellites. The accuracy parameter P1 takes a positive value.

Figure 5:
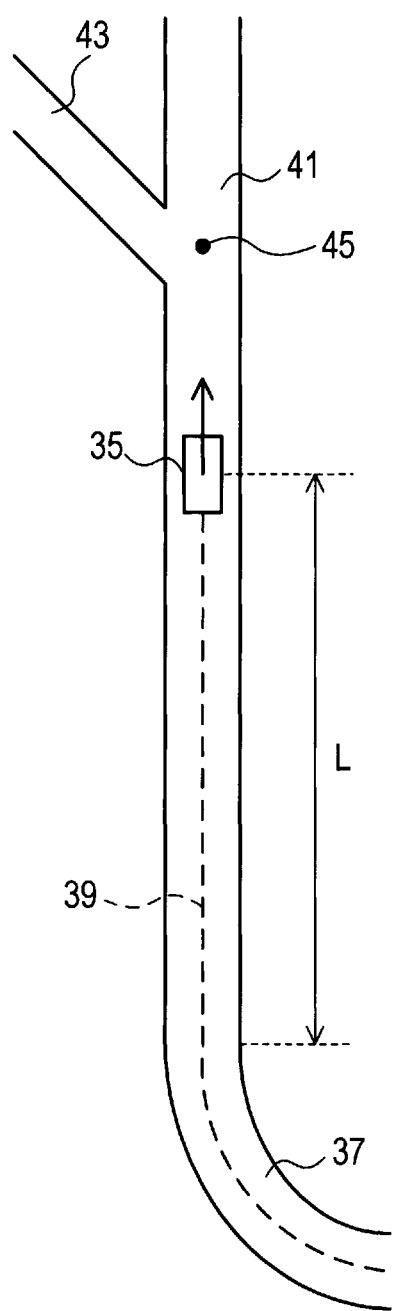
FIG. 5 is an illustrative example of a travel distance L.

In step S23, the accuracy calculation unit 17 calculates a travel distance L from the last curve 37 that the own vehicle 35 has passed to the own vehicle 35, as shown in FIG. 5. More specifically, the accuracy calculation unit 17 acquire a history 39 of the geographical location of the own vehicle, recognize the last curve 37 that the own vehicle 35 has passed in the history 39, and calculates a distance from the last curve 37 to the current location of the own vehicle 35, thereby acquiring the travel distance L.

In step S24, the accuracy calculation unit 17 calculates an accuracy parameter P2 as a function of the travel distance L acquired in step S23. The accuracy calculation unit 17 includes a second map that outputs the accuracy parameter P2 in response to the travel distance L. The accuracy calculation unit 17 uses the second map to acquire the accuracy parameter P2. In this map, the accuracy parameter P2 is decreased with increasing travel distance L. The accuracy parameter P2 takes a positive value.

In step S25, the accuracy calculation unit 17 calculates a product of the accuracy parameter P1 calculated in step S22 and the accuracy parameter P2 calculated in step S24, thereby finally acquiring a longitudinal accuracy parameter P. The longitudinal accuracy parameter P is a metric indicative of how high the longitudinal accuracy is. The greater the longitudinal accuracy parameter P, the higher the longitudinal accuracy. The longitudinal accuracy parameter P decreases with decreasing number of visible satellites used in the last GPS positioning and decreases with increasing travel distance L.

Returning back to FIG. 2, in step S5, the angle acquisition unit 19 acquires an angle θ from the map information stored in the map information storage 25. The angle θ is an angle at a branch location (or branch point) 45 between a center line 44 of an diverging road 43 and a center line 42 of the road 41 on which the own vehicle 35 is traveling, as shown in FIGS. 6A and 6B. The diverging road 43 is a road branching off from the road 41 on which the own vehicle 35 is traveling.

In step S6, the section setting unit 13 sets a pre-branch section. This processing will now be described with reference to FIG. 7.

In step S31, the section setting unit 13 determines an offset distance A. The offset distance A is a distance from a location of one of ends of the pre-branch section 46 that is closer to the own vehicle 35 than the other end to the branch location 45. The section setting unit 13 includes a third map that outputs the offset distance A in response to a combination of the longitudinal accuracy parameter P calculated in step S4 and the angle θ acquired in step S5. The section setting unit 13 determines the offset distance A using the third map. In the third map, the offset distance A is increased with decreasing longitudinal accuracy parameter P and increased with decreasing angle θ.

In step S32, the section setting unit 13 determines a section length B. The section setting unit 13 includes a fourth map that outputs the section length B in response to a combination of the longitudinal accuracy parameter P calculated in step S4 and the angle θ acquired in step S5. The section setting unit 13 determines the section length B using the fourth map. In the fourth map, the section length B is increased with decreasing longitudinal accuracy parameter P and increased with decreasing angle θ.

In step S33, the section setting unit 13 sets a pre-branch section using the offset distance A determined in step S31 and the section length B determined in step S32. As shown in FIGS. 6A and 6B, the pre-branch section 46 is a section extending the section length B from the start line 47 that is positioned closer to the own vehicle 35 than the branch location 45 by the section length B in the traveling direction of the own vehicle 35 (the upward direction in the Figs. FIG. 6A and 6B).

Returning back to FIG. 2, in step S7, the determination unit 15 determines whether or not the geographical location of the own vehicle acquired in step S2 is within the pre-branch section set in step S6. If the geographical location of the own vehicle acquired in step S2 is outside the pre-branch section set in step S6, then the process flow proceeds to step S8. If the geographical location of the own vehicle acquired in step S2 is within the pre-branch section set in step S6, then the process flow proceeds to step S9.

In step S8, the recognition unit 5 performs normal recognition processing for recognizing the lane partition lines as follows.

Extraction of Edge Points

The recognition unit 5 extracts edge points from the image acquired in step S1. More specifically, for each of horizontal lines in the image where a plurality of pixels forming the horizontal line have equal vertical coordinate values, differential values are calculated along the horizontal line using a differentiation filter. That is, for each horizontal line in the image, a rate of change in brightness value between adjacent pixels on the horizontal line is calculated.

Subsequently, for each calculated differential value, the recognition unit 5 determines whether or not the differential value is equal or greater than a predetermined upper limit. Coordinate values of pixels, the differential value at each of which pixels is determined to be equal or greater than the predetermined upper limit, are registered. Such pixels are extracted as edge points. It may be considered that the brightness value significantly changes between each of such pixels and its horizontally adjacent pixel.

Extraction of Lane Partition Line Candidates

Based on the edge points extracted as above, the recognition unit 5 extracts lane partition line candidates. Extraction of the lane partition line candidates may be performed via well-known line extraction Hough-transformation processing or the like. A plurality of lane partition line candidates may be detected in one frame of image.

Calculation of Lane Partition Line Likelihood

The recognition unit 5 calculates a lane partition line likelihood for each of the lane partition line candidates extracted as above in a well-known manner. For example, for each of the extracted lane partition line candidates, the recognition unit 5 may calculate a value of lane partition line likelihood for each of a plurality of items, such as the number of edge points forming the lane partition line candidate, a shape of the lane partition line candidate, and a position of the lane partition line candidate relative to another object, and then calculate a product of the values of lane partition line likelihood calculated for the respective items, thereby finally acquiring the lane partition line likelihood.

Lane Partition Line Recognition

The recognition unit 5 compares the lane partition line likelihood for each of the extracted lane partition line candidates with a predetermined threshold. Each of the lane partition line candidates having the lane partition line likelihood higher than the predetermined threshold is recognized as a lane partition line.

Figure 8A:
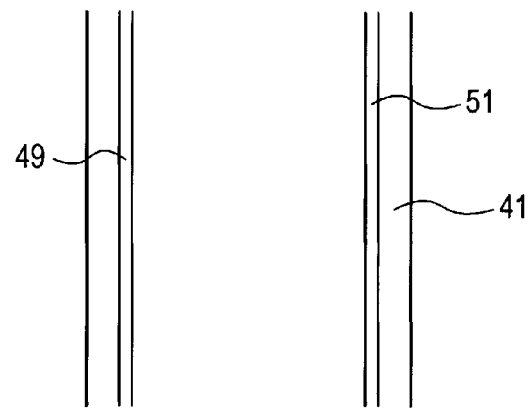
FIG. 8A is an illustrative example of lane partition lines recognized by normal lane partition line recognition processing.

In the above normal lane partition line recognition processing, the lane partition line recognition is performed on both sides of the road 41 on which the own vehicle 35 is traveling. That is, the lane partition line recognition is not suppressed even on the diverging road 43 side of the road 41 (e.g., on the left hand side of FIGS. 6A and 6B). Therefore, as shown in FIG. 8A, the lane partition lines 49, 51 can be recognized on both sides of the road 41.

In step S9, the recognition unit 5 performs the lane partition line recognition processing for the branch. This processing is basically similar to the processing in step S8 except that the lane partition line recognition is suppressed on the diverging road 43 side of the road 41 on which the own vehicle 35 is traveling. More specifically, as shown in FIG. 8B, the lane partition line 49 is inhibited from being recognized within the pre-branch section 46 of the road 41 on which the own vehicle 35 is traveling.

A way to inhibit the recognition unit 5 from recognizing the lane partition line 49 on the diverging road 43 side of the road 41 within the pre-branch section 46 may be appropriately provided. For example, on the diverging road 43 side of the road 41 within the pre-branch section 46, the recognition unit 5 may be inhibited from extracting the edge points, the recognition unit 5 may be inhibited from extracting the lane partition line candidates, the lane partition line likelihood may be decreased, or the threshold for the lane partition line likelihood may be increased.

Figure 8B:
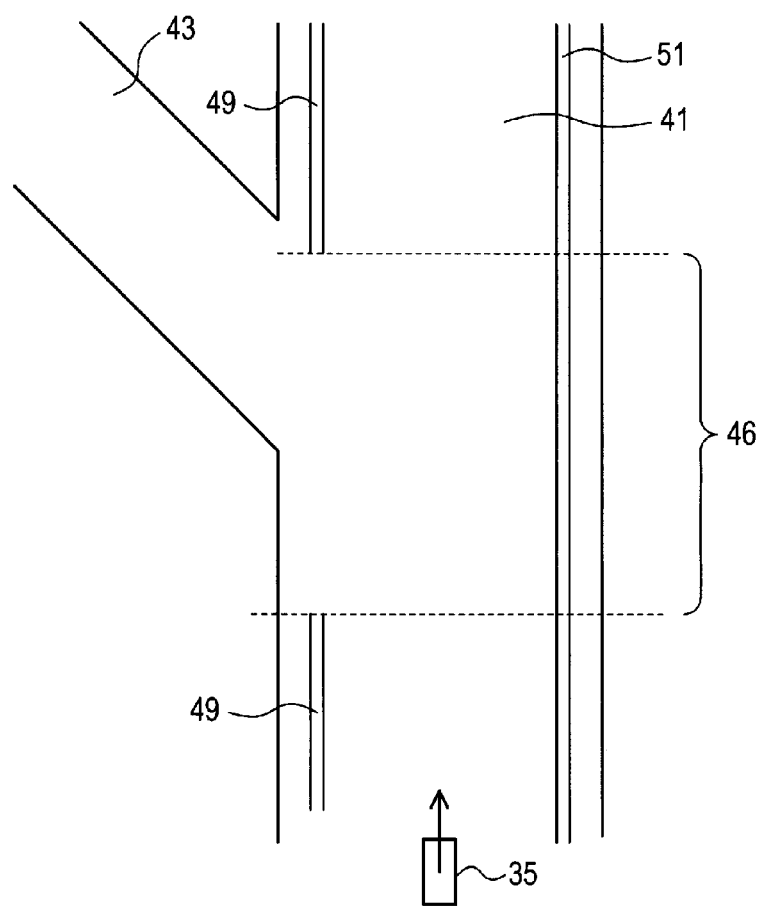
FIG. 8B is an illustrative example of a recognition result from lane partition line recognition processing for a branch.

Also in the lane partition line recognition processing for the branch, the lane partition line 51 is allowed to be recognized on the opposite side of the road 41 to the diverging road 43 side as in step S8, as shown in FIG. 8B.

Returning back to FIG. 2, in step S10, the recognition unit 5 outputs the lane partition lines recognized in step S8 or step S9 to at least one of the vehicle control unit 31 and the alert unit 33.

3. Advantages (1A) With comparative technologies, in the presence of the diverging road 43 forward of the own vehicle 35 as shown in FIGS. 6A and 6B, the lane partition line 53 of the diverging road 43 may be mistakenly recognized as the lane partition line 49 of the road 41 on which the own vehicle is traveling.

As above, the lane partition line recognition apparatus 1 sets the pre-branch section extending the section length B from the start line 47 that is positioned closer to the own vehicle 35 than the branch location 45 by the offset distance A in the traveling direction of the own vehicle 35.

Within the pre-branch section 46, the lane partition line recognition apparatus 1 suppresses recognition of the lane partition line 49 on the diverging road 43 side of the road 41 on which the own vehicle is traveling. This configuration can prevent the lane partition line 53 from being mistakenly recognized as the lane partition line 49.

In addition, the pre-branch section 46 begins at a location closer to the own vehicle 35 than the branch location 45 by the offset distance A. This configuration can prevent the lane partition line 53 from being mistakenly recognized as the lane partition line 49 even if the branch location 45 included in the map information or the geographical location of the own vehicle 35 is inaccurate.

(1B) Within the pre-branch section 46, the lane partition line recognition apparatus 1 is inhibited from recognizing the lane partition line 49 on the diverging road 43 side of the road on which the own vehicle is traveling. This configuration can further prevent the lane partition line 53 from being mistakenly recognized as the lane partition line 49.

(1C) The lane partition line recognition apparatus 1 is configured such that the offset distance A and the section length B are increased with decreasing longitudinal accuracy. This configuration allows the pre-branch section 46 to cover part of the lane partition line 53 in proximity to the road 41 even if the longitudinal accuracy is low. This can further prevent the lane partition line 53 from being mistakenly recognized as the lane partition line 49.

(1D) The lane partition line recognition apparatus 1 is configured to calculate the longitudinal accuracy such that the longitudinal accuracy is decreased with decreasing number of visible satellites. This allows the longitudinal accuracy to be calculated more accurately and more easily.

(1E) When the own vehicle is traveling on a straight road, it may be difficult to correct the geographical location of the own vehicle in the front-to-rear direction of the own vehicle via the map matching. Thus, the longitudinal accuracy tends to decrease with increasing travel distance L. Therefore, the lane partition line recognition apparatus 1 is configured to calculate the longitudinal accuracy such that the longitudinal accuracy is decreased with increasing travel distance L. This allows the longitudinal accuracy to be calculated more accurately and more easily.

(1F) The accuracy of the branch location 45 in the map information tends to become lower for smaller angles θ. As shown in FIG. 6A, for smaller angles θ, a parallel guidepath to the diverging road 43 may be provided at the branch location 45, which may cause the lane partition line 53 to be connected to the road 41 at a location much closer to the own vehicle 35 than usual.

The lane partition line recognition apparatus 1 is configured to set the pre-branch section 46 such that both the offset distance A and the section length B are increased with decreasing angle θ. This configuration allows the pre-branch section 46 to cover part of the lane partition line 53 in proximity to the road 41 even if the accuracy of the branch location 45 in the map information is low or if the lane partition line 53 is connected to the road 41 at a location much closer to the own vehicle 35 than usual. This can prevent the lane partition line 53 from being mistakenly recognized as the lane partition line 49.

Modifications

It is to be understood that the invention is not to be limited to the specific embodiment disclosed above and that modifications and other embodiments are intended to be included within the scope of the appended claims.

Figure 9:
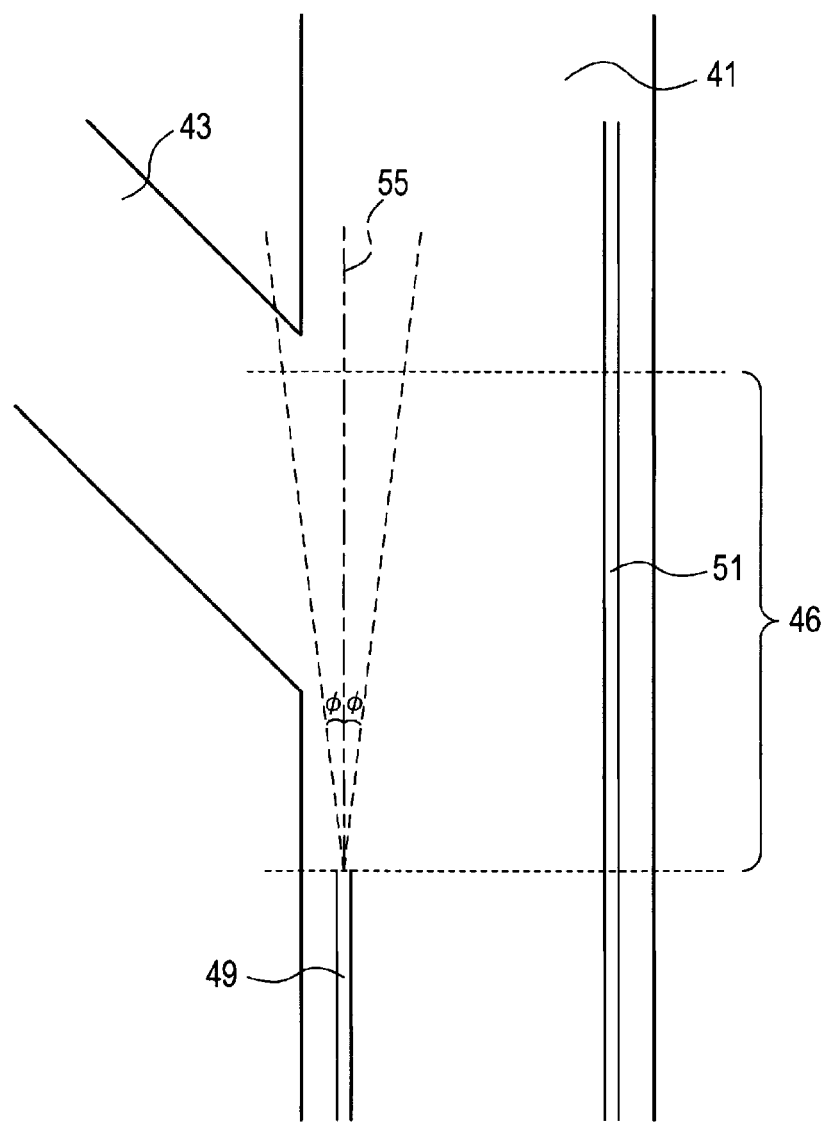
FIG. 9 is a modification to the embodiment where recognition of lane partition lines is suppressed on the diverging road side.

(1) Another way to suppress recognition of the lane partition line on the diverging road side of the road on which the own vehicle is traveling may be used. For example, as shown in FIG. 9, given an extrapolation line 55 of the lane partition line 49 recognized on the diverging road 43 side with the extrapolation line 55 extending from the start line of the pre-branch section 46, recognition of the lane partition line 49 within the pre-branch section 46 may optionally be allowed only if an angle between the extrapolation line 55 and the lane partition line 49 is equal to or less than a threshold cp.

Figure 10:
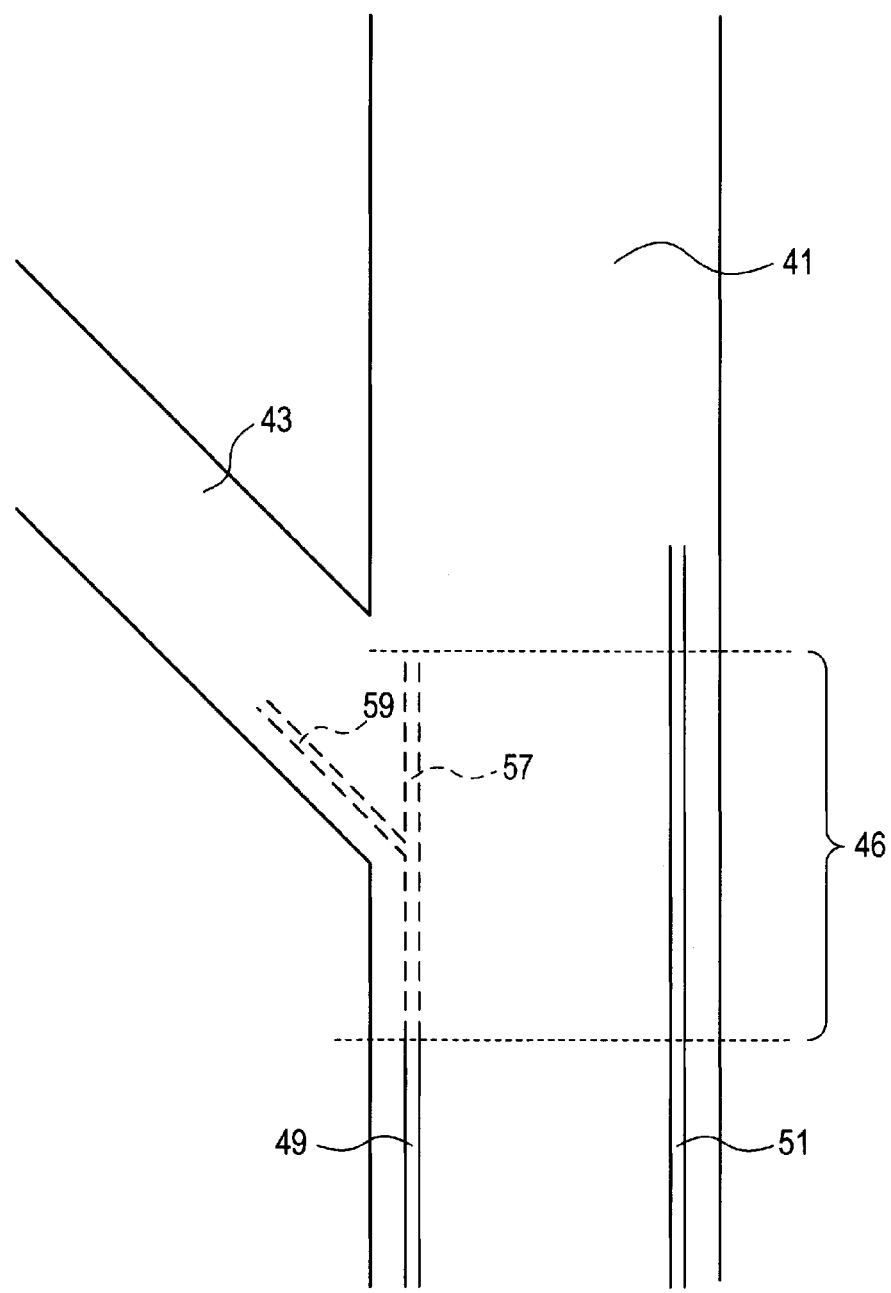
FIG. 10 is another modification to the embodiment where recognition of lane partition lines is suppressed on the diverging road side.

In addition, as shown in FIG. 10, in the presence of a plurality of lane partition line candidates 57, 59 on the diverging road 43 side recognized within the pre-branch section 46, the lane partition line candidate other than the lane partition line candidate 57 positioned on the most opposite side of the road 41 to the diverging road 43 may be inhibited from being recognized as a lane partition line.

Recognition of the lane partition line on the diverging road side may be suppressed by modifying a lane partition line recognition algorithm or settings in the lane partition line recognition. For example, recognition of the lane partition line on the diverging road side may be suppressed by tightening criteria for extracting edge points on the diverging road side, by tightening criteria for extracting the lane partition line candidates, by suppressing the lane partition likelihood, or by increasing the threshold for the lane partition line likelihood, as compared with recognition of the lane partition line on the opposite side to the diverging road.

Suppressing recognition of the lane partition line on the diverging road side of the traveled road (that is the road on which the own vehicle is traveling) may include not recognizing at all the lane partition line on the diverging road side of the traveled road or rendering the lane partition line more difficult to recognize on the diverging road side of the traveled road than on the opposite side of the traveled road to the diverging road.

(2) Either or both of the distance A and the section length B may be fixed in value. This configuration can reduce a processing burden of the lane partition line recognition apparatus 1.

(3) The longitudinal accuracy may be calculated based on the travel distance L, regardless of the number of visible satellites. Alternatively, the longitudinal accuracy may be calculated based on of the number of visible satellites, regardless of the travel distance L.

(4) The offset distance A may be calculated based on the angle θ, regardless of the longitudinal accuracy. Alternatively, the offset distance A may be calculated based on the longitudinal accuracy, regardless of the angle θ.

The section length B may be calculated based on the angle θ, regardless of the longitudinal accuracy. Alternatively, the section length B may be calculated based on the longitudinal accuracy, regardless of the angle θ.

(5) The functions of one of components of any one of the above embodiments may be distributed to a plurality of components, or the functions of a plurality of components may be integrated into one component. At least part of the configuration of any one of the above embodiments may be replaced with a known configuration having a similar function. At least part of the configuration of any one of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(6) It should be appreciated that the invention is not to be limited to the lane partition line recognition apparatuses disclosed above and that the present invention can be implemented in numerous ways, including as a system that includes any one of the lane partition line recognition apparatuses as a component, a program for enabling a computer to function as any one of the lane partition line recognition apparatuses, a non-transitory computer readable storage medium storing such a program, and a lane partition line recognition method.

What is claimed is:

1. An apparatus for recognizing a lane partition line, comprising:
    an image acquisition unit configured to acquire an image of a front view of a vehicle carrying the apparatus;
    a recognition unit configured to recognize the lane partition line based on the image acquired by the image acquisition unit;
    a map information acquisition unit configured to acquire map information including a branch location on a road on which the vehicle is traveling from a map information storage storing the map information;
    a location information acquisition unit configured to acquire location information of the vehicle;
    a geographical location acquisition unit configured to acquire a geographical location of the vehicle based on the map information and the location information of the vehicle acquired by the location information acquisition unit;
    a pre-branch section setting unit configured to set a pre-branch section of the road on which the vehicle is traveling, the pre-branch section extending a section length from a start line that is positioned closer to the vehicle than the branch location by an offset distance in a traveling direction of the vehicle; and
    a determination unit configured to, based on the geographical location of the vehicle acquired by the geographical location acquisition unit and the pre-branch section of the road set by the pre-branch section setting unit, determine whether or not the geographical location of the vehicle is within the pre-branch section of the road on which the vehicle is traveling,
    wherein the recognition unit is configured to, if it is determined by the determination unit that the geographical location of the vehicle acquired by the geographical location acquisition unit is within the pre-branch section of the road on which the vehicle is traveling set by the pre-branch section setting unit, suppress recognition of the lane partition line on an diverging road side of the road on which the vehicle is traveling, the diverging road branching off from the road on which the vehicle is traveling at the branch location.

2. The apparatus of claim 1, wherein suppressing recognition of the lane partition line on the diverging road side of the road on which the vehicle is traveling includes not recognizing the lane partition line on the diverging road side of the road on which the vehicle is traveling.

3. The apparatus of claim 1, further comprising an accuracy calculation unit configured to calculate longitudinal accuracy of the geographical location of the vehicle acquired by the geographical location acquisition unit,
    wherein the pre-branch section setting unit is configured to set the pre-branch section such that at least one of the offset distance and the section length is increased with decreasing longitudinal accuracy.

4. The apparatus of claim 3, wherein
    the location information acquisition unit is configured to acquire the location information of the vehicle using a satellite positioning system, and
    the accuracy calculation unit is configured to calculate the longitudinal accuracy of the geographical location of the vehicle such that the longitudinal accuracy decreases with decreasing number of the visible satellites used when the location information acquisition unit acquires the location information of the vehicle.

5. The apparatus of claim 3, wherein
    the geographical location acquisition unit is configured to acquire the geographical location of the vehicle using map matching, and the accuracy calculation unit is configured to calculate the longitudinal accuracy of the geographical location of the vehicle such that the longitudinal accuracy decreases with increasing travel distance from the last curve that the vehicle has passed to the vehicle.

6. The apparatus of claim 1, further comprising an angle acquisition unit configured to, based on the map information, acquire an angle at the branch location between the diverging road and the road on which the vehicle is traveling, wherein the pre-branch section setting unit is configured to set the pre-branch section of the road on which the vehicle is traveling such that at least one of the offset distance and the section length increases with decreasing angle.

* * * * *